April 8, 1930. J. C. HOFFMAN 1,754,104
EXTENSIBLE BUMPER FOR AUTOMOBILES
Filed Aug. 3, 1929
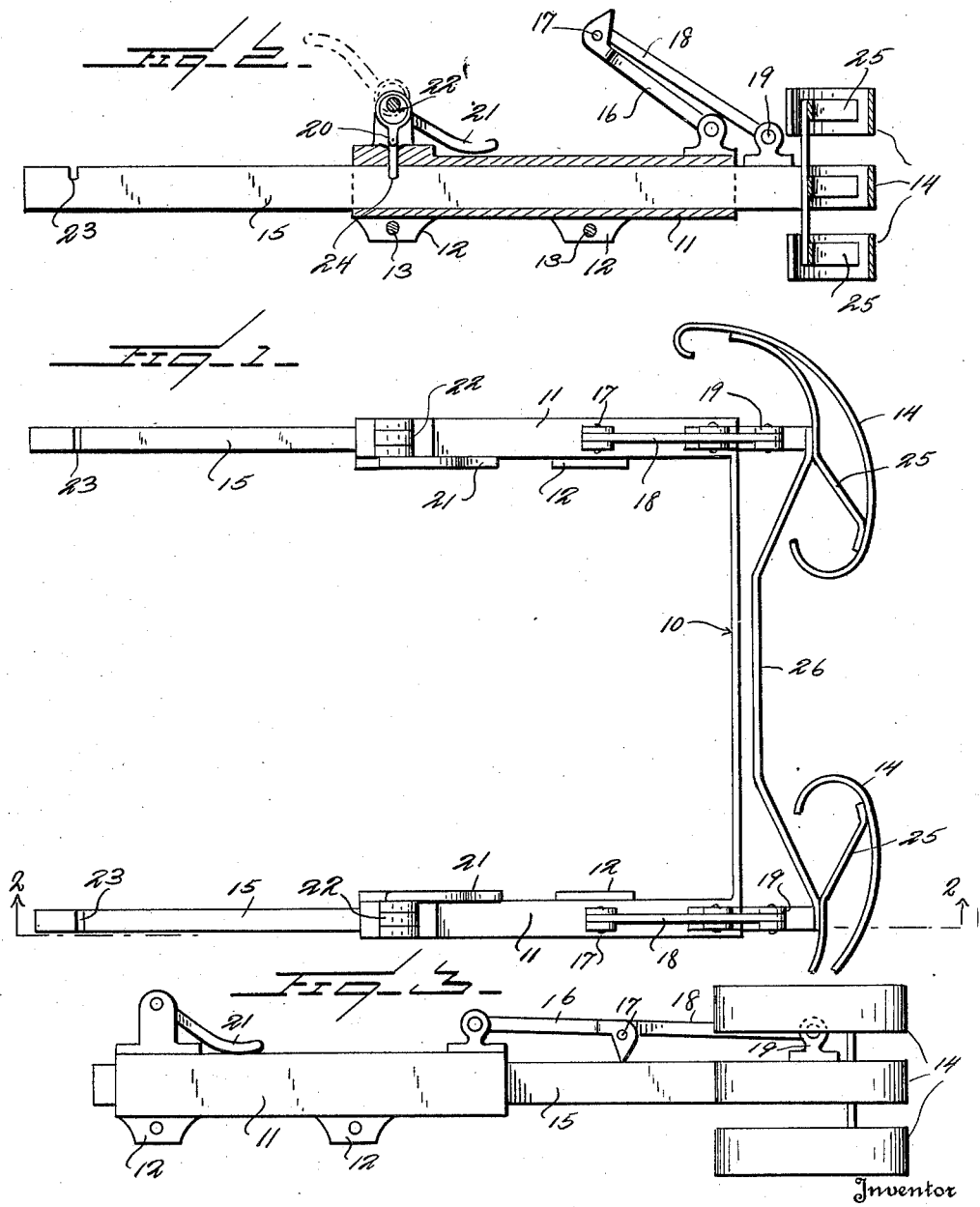

Patented Apr. 8, 1930

1,754,104

UNITED STATES PATENT OFFICE

JOHN C. HOFFMAN, OF SIOUX CITY, IOWA

EXTENSIBLE BUMPER FOR AUTOMOBILES

Application filed August 3, 1929. Serial No. 383,199.

This invention relates to bumpers for automobiles, particularly the bumpers carried on the rear ends thereof, and the general object of the invention is to provide an extensible bumper which may be retracted and held locked in its retracted position or which may be projected rearward whenever desired.

The general object of this invention is to provide a device of this character which includes a supporting frame adapted to be fastened to or mounted upon the chassis of the automobile at the rear end thereof, with which frame telescopically engage the shanks of two single bumpers or the shanks of a double bumper, means being provided whereby the bumpers may be held locked in a projected position or in a retracted position.

My invention is illustrated in the accompanying drawing, wherein:—

Figure 1 is a top plan view of my extensible bumper;

Figure 2 is a vertical sectional view thereof on the line 2—2 of Figure 1;

Figure 3 is a side elevation of the structure shown in Figures 1 and 2 retracted.

Referring to this drawing, 10 designates a supporting frame having two parallel tubular members 11 mounted one upon each side of the frame, these tubular members being shown as provided with lugs 12 whereby the bumper frame may be attached to the frame of an automobile, as by bolts 13. Preferably, though not necessarily, the members 11 are rectangular in cross section. The bumpers 14, which may be of any suitable construction, are provided with shanks 15, each of these shanks having telescopic engagement in the corresponding tubular member 11. Mounted upon the forward end of each tubular member 11 is an arm 16 pivoted at 17 to a second arm 18, which in turn is pivoted to a bifurcated lug 19 on the forward end of the corresponding bumper shank 15. It will be seen that when the bumper shank is shifted fully outward and the bumper extended in a rearward direction, these arms 16 and 18 will be in alignment with each other and will resist any rearward movement of the bumper shank and bumper and that when the arms are in the position shown in Figure 2, with the bumper retracted, the arms will tend to resist any inward movement of the bumper beyond this position.

In addition to these arms, which arms act to support the bumper when it is fully pulled out, I provide a latch bolt 20 operatively connected to a lever 21. This lever is provided with a cam 22 at its inner end which, when the cam is turned to the position shown in Figure 2, will force the locking bolt down into one or the other of two recesses 23 or 24 formed in the shank 15.

When the lever 21 is turned to the dotted line position, it raises the bolt so as to permit the shank to be shifted longitudinally through the tubular member 11. There are two of these recesses 23 and 24 so that the shank may be locked in either its fully projected position or a fully retracted position.

The bumpers carried on the forward ends of the shanks are spring bumpers, shown as formed of three spring leaves, each designated 14, and connected by resilient members 25 to the corresponding shank. Under some circumstances, both shanks and both bumpers may be connected by a transverse rod 26, but I do not wish to be limited to this.

It will be seen that my invention provides for the projection or retraction of the bumpers and holding the bumpers either in a projected or retracted position. The particular reason for projecting or retracting the bumpers is to provide accommodations for a trunk carried upon the rear end of the automobile or of luggage thereon.

I do not wish to be limited to the exact details shown, as it is obvious that these may be changed in minor respects without departing from the spirit of the invention as defined in the appended claims.

The particular advantage in using extensible bumpers constructed in accordance with my invention is that when the trunks used on automobiles are exposed, there is no protection from the rear and in a collision, they become badly dented or ruined and must be returned to the factory for repairs. With a bumper such as I have devised extending three to four or even five feet rearward and being locked in this extended position, the car which would otherwise ram the trunk rams the bumper, which takes the force of the collision and protects the exposed trunk. Practically all new trunks now open outward and must have some form of protection. This is provided by the extensible bumper or bumpers.

While in Figures 1 and 2, I have illustrated the arms 16 and 18 as being so constructed that the arms will be disposed both at an acute angle to each other when the bumper is retracted, yet I do not wish to be limited to this as the arms might readily be constructed to lie down, it being only necessary to offset the arms 16 and 18 with relation to each other and offset the mounts therefor. These arms are designed, however, mainly for the purpose of holding the bumpers secure when projected so that if something should go wrong with the latch, they would practically lock the bumper in an extended position as shown in Figure 2. They are of value also in case the latch should break and it be desirable to extend the bumpers and hold them in an extended position until a new latch can be used. This attachment is adapted to be applied to all motor cars as usually made inasmuch as the tubular element 11 is connected to the frame of the car by the same lug or lugs that the ordinary bumper is attached by. Thus it will only be necessary to take off the old bumper and fasten the tubular elements in place.

I claim:—

1. An extensible bumper for motor cars comprising a tubular element, a bumper, a shank having sliding engagement through the tubular element, arms, one pivoted to the shank of the bumper and the other pivoted to the tubular element, the arms being pivoted to each other, and when the bumper is projected being disposed in alignment with each other and when retracted being disposed in a position nearly parallel to each other, and means for locking the shank in a projected or retracted position.

2. An extensible bumper for motor cars comprising a tubular element, a bumper, a shank having sliding engagement through the tubular element, arms, one pivoted to the shank of the bumper and the other pivoted to the tubular element, the arms being pivoted to each other and when the bumper is projected being disposed in alignment with each other and when retracted being disposed into a position nearly parallel to each other, means for locking the shank in a projected or retracted position including recesses in the shank, and a retractible bolt shiftable into engagement with either of said recesses.

3. An extensible bumper for motor cars comprising two tubular elements having means whereby they may be mounted upon the frame of a motor car, bumpers having shanks having sliding engagement in the tubular elements, the shanks and bumpers being connected, arms pivoted to each other and at their ends pivoted respectively to the shanks and to the ends of the tubular elements and adapted when the bumpers are extended to be disposed in alignment and when the bumpers are retracted to be disposed in nearly parallel relation to each other, and means for latching the bumpers either in a retracted or projected position.

4. An extensible bumper for motor cars comprising a guide element, a bumper, a shank having sliding engagement through the guide element, arms, one pivoted to the shank of the bumper and the other pivoted to the guide member, the arms being pivoted to each other and when the bumper is projected, being disposed in alinement with each other and when retracted being disposed in a position nearly parallel to each other.

In testimony whereof I hereunto affix my signature.

JOHN C. HOFFMAN.